United States Patent [19]

Okamura et al.

[11] 4,342,230
[45] Aug. 3, 1982

[54] PRESSURE SENSOR AND SENSING METHOD

[75] Inventors: Kenji Okamura; Kenji Masaki, both of Yokohama, Japan

[73] Assignee: Nissan Motor Company, Limited, Kanagawa, Japan

[21] Appl. No.: 160,386

[22] Filed: Jun. 17, 1980

[30] Foreign Application Priority Data

Jun. 19, 1979 [JP] Japan .................................. 54-76347

[51] Int. Cl.³ .............................................. G01L 9/00
[52] U.S. Cl. ........................................ 73/702; 73/704; 73/723
[58] Field of Search ................. 73/702, 704, 705, 723, 73/717, 733

[56] References Cited

U.S. PATENT DOCUMENTS

| | | | |
|---|---|---|---|
| 1,431,914 | 10/1922 | Dashner et al. ................. | 123/196 S |
| 2,919,576 | 1/1960 | Weller et al. ......................... | 73/115 |
| 3,441,695 | 4/1969 | Stedfeld et al. ........................ | 200/81 |
| 4,195,531 | 1/1980 | Okamura ................................ | 73/723 |

FOREIGN PATENT DOCUMENTS

| | | |
|---|---|---|
| 2212954 | 2/1972 | Fed. Rep. of Germany . |
| 2630305 | 1/1978 | Fed. Rep. of Germany . |
| 2413649 | 7/1979 | France . |
| 543329 | 2/1942 | United Kingdom . |
| 1276294 | 1/1972 | United Kingdom . |

OTHER PUBLICATIONS

Price, "Vibrating-Contact Pressure", Instr. & Control Systems, Nov., 1969, pp. 81–84.

*Primary Examiner*—Donald O. Woodiel
*Attorney, Agent, or Firm*—Lowe, King, Price & Becker

[57] ABSTRACT

A pressure sensor and sensing method, wherein the sensor comprises a pressure responsive element movable corresponding to a pressure to be measured and a means for detecting movement of the pressure responsive element. The movement detecting element comprises two parts of switch means movable to and fro with respect to each other, and a substantially constant oscillation is applied to one part so that movement of the pressure responsive element alters a threshold value which is applied to the substantially constant oscillation in order to produce a varying pulse signal.

21 Claims, 18 Drawing Figures

PRESSURE SENSOR AND SENSING METHOD

BACKGROUND OF THE INVENTION

The present invention relates generally to a pressure sensor for detecting the average pressure of a fluid such as air vapor or liquid. More particularly, the present invention relates to a pressure sensor for detecting variation of pressure in use with a pressure sensitive elastic or expansible member.

FIG. 1 shows a conventional pressure sensor being applicable for detecting pulsating pressure such as an exhaust gas pressure of a reciprocating internal combustion engine. The pressure sensor 10 generally comprises a sensor casing 12 having therein a pressure chamber 14 defined by the internal periphery of the sensor casing 12 and a diaphragm 16 of flexible or elastic material. The pressure chamber 14 communicates with a pressure introducing passage 18 through which pressurized fluid such as air, vapor or liquid of which the pressure to be detected is introduced into the pressure chamber 14. An electrically conductive movable contact 20 is movably received within another chamber 22 which is also defined by the internal periphery of the sensor casing 12 and the diaphragm 16 at the opposite side of the pressure chamber 14 with respect to the diaphragm 16. The movable contact 20 is connected to an electrode 24 adjacent the outer periphery thereof. The electrode 24 is connected with a smoothing circuit 26 for smoothing the sensor output and is inserted into the chamber 22 through an opening 28 formed in the casing. The movable contact 20 is formed by an elastic and electrically conductive material and is provided, at the central portion thereof with a movable terminal 30. Opposing the terminal 30, the other electrode 32 is inserted to the chamber 22 through an opening 24 formed in the casing 12.

A set spring 36 for applying to the diaphragm 16 an initial set pressure $P_0$ is disposed within the pressure chamber 14. When the positive pressure introduced through the passage 18 exceeds the set pressure $P_0$, the diaphragm 16 is pushed toward the electrode 32 by the introduced pressure and thereby the terminal 30 contacts the electrode to complete closed circuit. A return spring 35 for returning the movable contact 20 to neutral position is disposed within the chamber 22. A stopper 37 is also provided within the chamber 22 to limit movement of the movable contact in the direction approaching the diaphragm 16. In other words, the electrode 32 and the terminal 30 form an ON/OFF switch turning ON or OFF in response to the pulsating pressure introduced within the pressure chamber 14.

When the pulsating pressure of the air, vapor or liquid is introduced into the pressure chamber 14 and the pressure is applied to the diaphragm 16, output of the switching means consisting of the terminal 30 and the electrode 32 is a pulse signal. FIG. 2 shows variation of the electric voltage at a point 38. The pulse output is inputted to the smoothing circuit 26 and is smoothed in order to obtain an average output $E_m$. The average output $E_m$ of the smoothing circuit 26 is calculated arithmetically to obtain an average pressure $P_m$ of the pulsatile pressure.

In such a conventional pressure sensor, the set pressure applied to the diaphragm 16 by the set spring 36 is determined so that it is between the maximum and minimum pressure of the pulsating pressure to be detected. Therefore, if the pressure applied to the diaphragm 16 is relatively high with respect to the set pressure $P_0$, the period for which the diaphragm 16 is urged toward the electrode 32 is relatively long. Namely, the period for which the diaphragm 16 is urged toward the electrode and thereby the terminal 30 contacts to the electrode 32 is proportional to the pressure applied to the diaphragm. In this conventional sensor, the pressure value is converted to this time period and by measuring the period corresponding to the applied pressure, the value of pressure is determined. Therefore, if a constant pressure is introduced into the pressure chamber, the diaphragm will be stationary in the neutral position if the pressure is less than the set pressure $P_0$ and stationary in the urged position if the pressure exceeds the set pressure. Thus, converting the pressure to the time period and measuring the period is practically impossible in this case. Further, if a pressure with a small pulse height is introduced into the pressure chamber, it is also impossible to detect a pressure exceeding the reference pressure $P_0$, and therefore it is impossible to determine the pressure.

SUMMARY OF THE INVENTION

The present invention aims to provide a pressure sensor and sensing method capable of exactly and successfully detecting fluid pressure even if the fluid has a constant pressure. In the general concept of the present invention, a switching element such as an ON/OFF switch or other element sensitive to pressure is moved to output intermittently an electric charge. The switching element consists of at least two parts separated from each other, and one of the switching elements is moved to and fro with respect to the other. The distance between the parts of the switching element is variable corresponding to the fluid pressure to be measured.

Therefore, it is a general object of the present invention to provide a pressure sensor which has a switching element which generates an electrical signal in response to a fluid pressure, and which can convert the pressure value into a period of time proportional or inversely proportional to the pressure to be determined.

Another object of the present invention is to provide a pressure sensor having a switching element consisting of at least two parts which are separated from one another and one of which is movable with respect to the other. The distance between the parts of the switching element is determined by the pressure to be measured and the distance defines the period of time for which the switching element is turned ON.

According to the present invention, a pressure sensor comprises a pressure responsive element movable corresponding to a pressure to be measured and a means for measuring the movement of the pressure responsive element. The movement measuring element comprises at least two parts one of which is movable to and fro with respect to the other.

Preferably, the movement measuring element is an electric switching means which has at least two switching elements one of which incorporates a means for providing thereto a vibration of constant magnitude. The switching element converts the pressure value to be detected into a time period.

BRIEF DESCRIPTION OF THE DRAWINGS

The present invention will become more fully understood from the detailed description given below, and from the accompanying drawings of the several embodiments of the present invention, which, however, are not to be taken as limitative of the present invention in any way, but are for the purpose of elucidation and explanation only.

In the drawings:

FIG. 4 is a graph showing the relationship between the vacuum pressure introduced into the pressure sensor of FIG. 3 and the period of time for which a switch is turned on;

DESCRIPTION OF THE PREFERRED EMBODIMENT

Figure 3:
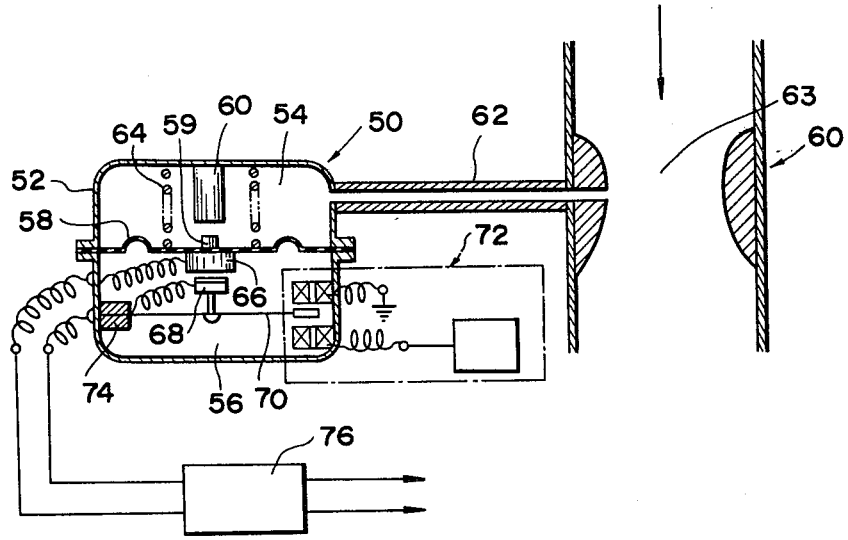
FIG. 3 is a sectional view of a pressure sensor according to one embodiment of the present invention, in which the pressure sensor is applied to measure a vacuum pressure in a venturi portion of an air intake passage communicating with an internal combustion engine.

In FIG. 3 is illustrated a preferred embodiment of the present invention. Although FIG. 3 shows an example applying a pressure sensor according to the present invention to the measurement of vacuum pressure in intake air flowing through a venturi portion, this is not intended to specify the application of the sensor which also is not intended to detect only a vacuum pressure.

In FIG. 3, a pressure sensor 50 generally comprises a sensor casing 52 which is divided into a pressure chamber 54, and a second chamber 56 by a diaphragm 58 made of elastic material. The pressure chamber 54 communicates through a pressure introducing passage 62 with a venturi portion 63 of an intake air passage 60 for introducing the intake air to an internal combustion engine. Within the pressure chamber 54 is disposed a set spring 64 which determines an initial position of the diaphragm 58 and thereby applies an initial set pressure to the diaphragm. When the vacuum pressure is introduced into the pressure chamber 54 and the vacuum pressure exceeds the initial set pressure, the diaphragm is moved toward the pressure chamber 54 until the vacuum pressure reduced by movement of the diaphragm balances with the initial pressure or a projection 59 contacts a stopper 60.

On the surface of the diaphragm 58 facing the chamber 56, a contact 66 is secured so as to move together with the diaphragm. Facing the contact 66, is provided another contact 68, which is secured on an elastic or resilient arm 70 one end of which is mechanically connected with a vibration providing device 72 and the other end of which is secured on the inner surface of the casing 52 by a support 74. The vibration providing device 72 operates to vibrate the arm 70 and thereby to move the contact rapidly to and fro with respect to the contact 66. The contacts 66 and 68 form an ON/OFF switch 74 frequently turning ON and OFF and are electrically connected to an arithmetic circuit 76 which measures the period for which the ON/OFF switch 74 is turned ON and based on the measured period, calculates the vacuum pressure introduced in the pressure chamber 54.

Figure 1:
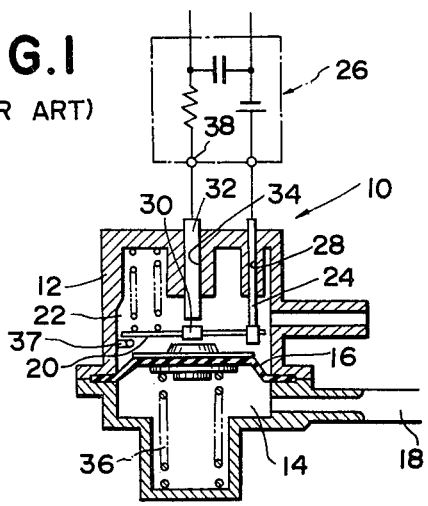
FIG. 1 is a sectional view of a typical construction of a conventional pressure sensor.
Figure 2:
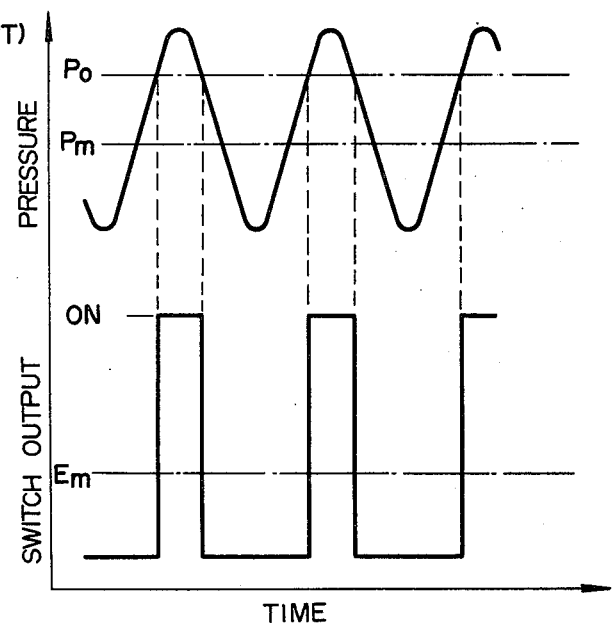
FIG. 2 is a graph showing the relationship between a pressure introduced into the pressure sensor of FIG. 1 and sensor output as the result of measurement.
Figure 4:
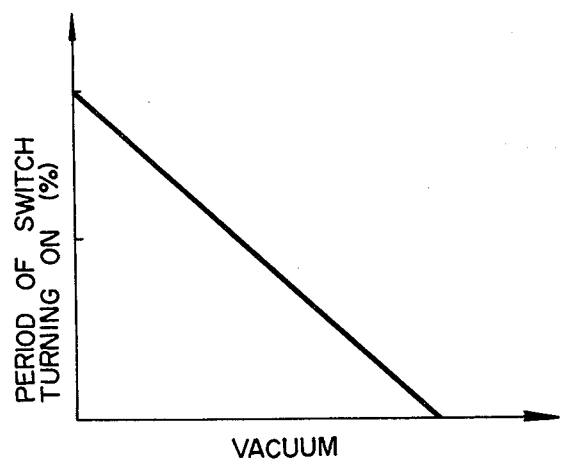
Figure 5A:
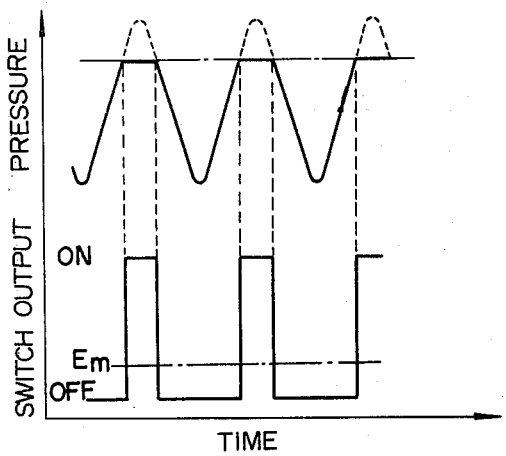
FIGS. 5(A) to 5(C) are graphs similar to FIG. 2 showing the relationship between the period of time the switch is turned on when the introduced vacuum is relatively high (FIG. 5(A)), when the introduced vacuum is relatively low (FIG. 5(C)) and when the introduced pressure is between the higher and lower values (FIG. 5(B))
Figure 5B:
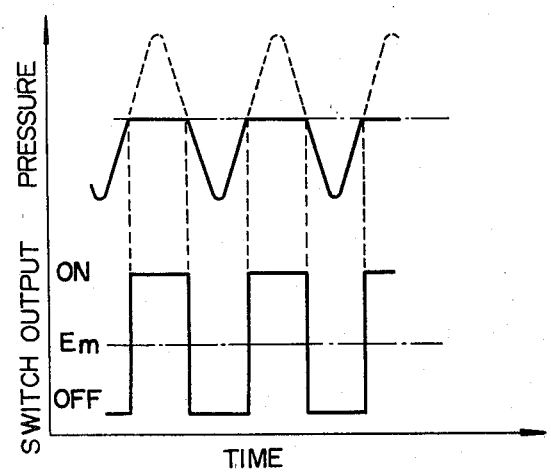
Figure 5C:
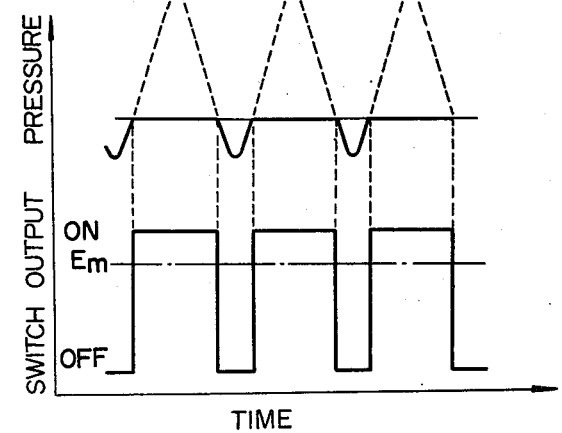

When a vacuum pressure is introduced into the pressure chamber 54, the diaphragm is moved toward the pressure chamber. At this time, the magnitude of the diaphragm movement corresponds to the vacuum pressure introduced. By movement of the diaphragm 58, the contact 66 moves away from the contact 68. Also, at this time, the distance between the contacts 66 and 68 corresponds to the vacuum pressure. Here, if a constant vibration is applied to the arm 70, and thereby the contact 68 is moved to and fro with respect to the contact 66 constantly, the period for which the contact 68 contacts the contact 66 is inversely proportional to the distance between the contacts 66 and 68. The relationship between the introduced vacuum which determines the distance between the contacts 66 and 68 and the period of time for which the contacts are in contact is shown in FIG. 4. FIG. 5(A) to 5(C) respectively show graphs similar to FIG. 2 for relatively high vacuum pressure, for intermediate vacuum pressure and for relatively low vacuum pressure. As shown in FIG. 5(A), when the vacuum pressure introduced in the pressure chamber 54 is relatively high, since the gap between the contacts 66 and 68 is relatively wide, the period of time for which the contacts 66 and 68 contact is relatively short. On the other hand, when the vacuum introduced in the pressure chamber 54 is relatively low, the gap between the contacts 66 and 68 is relatively narrow and therefore the period of time for which the contacts contact is relatively long, as shown in FIG. 5(C).

Figure 6:
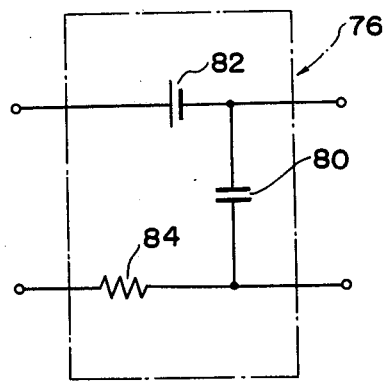
FIG. 6 is a schematic diagram of a smoothing circuit employed in the pressure sensor of FIG. 3.
Figure 7:
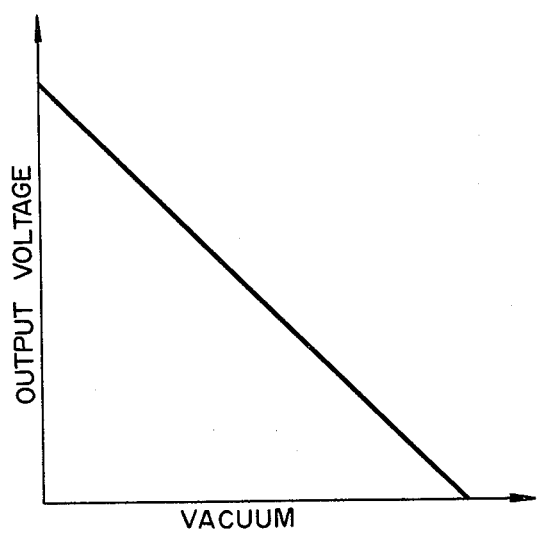
FIG. 7 is a graph showing the variation of output of the smoothing circuit of FIG. 6 corresponding to the introduced vacuum.

The arithmetic circuit 76 detects the period in which the switch 74 is turned ON and is conducting. Thus, by measuring the period of time the switch 74 is ON, the variation of the vacuum pressure can be detected. FIG. 6 shows one embodiment of the arithmetic circuit 76 which comprises a capacitor 80, a resistor 82 and a battery 84 which form a circuit working as a smoothing circuit. When the electric charge is supplied to the arithmetic circuit 76, the circuit 76 smooths the input and outputs a constant output $E_m$. Therefore, by measuring the output $E_m$ of the arithmetic circuit, the vacuum pressure introduced into the pressure chamber 54 is measured. FIG. 7 shows the relationship between the vacuum pressure flowing through the venturi portion 63 and introduced into the pressure chamber 54 and the output $E_m$ of the arithmetic circuit 76. Based on the output $E_m$ of the arithmetic circuit 76, the fuel injection amount of a fuel injection system, exhaust gas recirculation amount of an exhaust gas recirculating system, ignition timing of an spark ignition system and air intake amount of an intake air flow rate control system and so on may be controlled.

Figure 8:
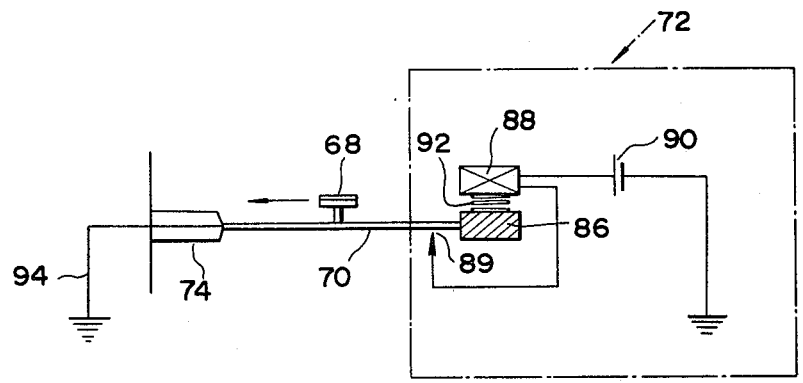
FIG. 8 is a diagrammatical view of a vibration providing device employed in the pressure sensor of FIG. 3.

Now we describe in more detail the vibration providing device 72 with reference to FIG. 8 in which is illustrated an embodiment of the present invention. It should be understood that although hereafter is described a specific construction of the vibration providing device 72, this is merely given for better understanding of the invention and should not be taken as limitative thereto. In FIG. 8, the vibration providing device 72 comprises a magnetic element 86 secured to one end of the arm 70, an electromagnet 88 facing the magnetic element 86 and provided with a battery 90, and an electrically conducting brush 99 electrically connected to the electromagnet 88 and located facing the arm. Between the electromagnet 88 and the magnetic element 86 is disposed a spring 92. The arm 70 is made of electrically conductive material and is electrically connected to ground through a lead 94. This construction is similar to that well known as a construction of a bell. In operation, by breaking and completing the circuit consisting of the battery 90, electromagnet 88, brush 89, arm 70 and lead 94, electric current is intermittently applied to the electromagnetic element to repeatedly energize and deenergize the electromagnet 88. By this, the contact 86 is rapidly moved together with the arm 70 and thereby the arm is vibrated. According to the vibration of the arm 70, the contact 68 secured thereon is vibrated to repeatedly move to and fro with respect to the contact 66.

Figure 9:
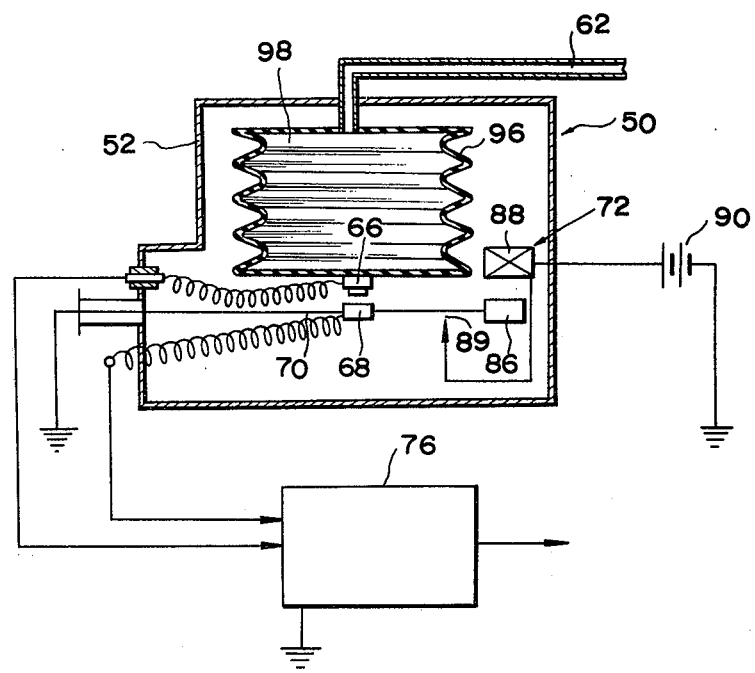
FIG. 9 is a sectional view of a modification of the pressure sensor of FIG. 3.

FIG. 9 shows a modification of the embodiment of FIG. 3. In the description given below elements and features having substantially the same constructions and functions are represented by the same reference numerals as indicated in FIG. 3. In the modification shown, the principal difference from the preceding embodiment is the use of a hollow bellows 96 as a pressure chamber 98.

The bellows 96 is disposed within a sensor casing 52 and communicates with a pressure or vacuum introducing passage 62. On the outer bottom surface of the bellows, a contact 66 is secured. Facing the contact 66, a contact 68 is secured to an arm 70 one end of which is mechanically connected to a vibration providing device 72 and the other end is secured to the peripheral wall of the casing 52. The vibration providing device 72 is of substantially the same construction as the foregoing embodiment, explained with reference to FIG. 8 and comprises a battery 90, electromagnet 88, magnetic element 86, and brush 89. Both contacts 66 and 68 are electrically connected to an arithmetic circuit 76.

If a vacuum pressure is introduced into the pressure chamber 98 defined within the bellows 96, the bellows 96 contracts to move the contact 66 away from the contact 68. The distance between the constants 66 and 68 is determined by the value of the vacuum pressure. By providing vibration to the arm 70, the constant 68 repeatedly contacts and is released from the contact 66. The arithmetic circuit 76 determines the period contacting the contacts 66 and 68.

Figure 10:
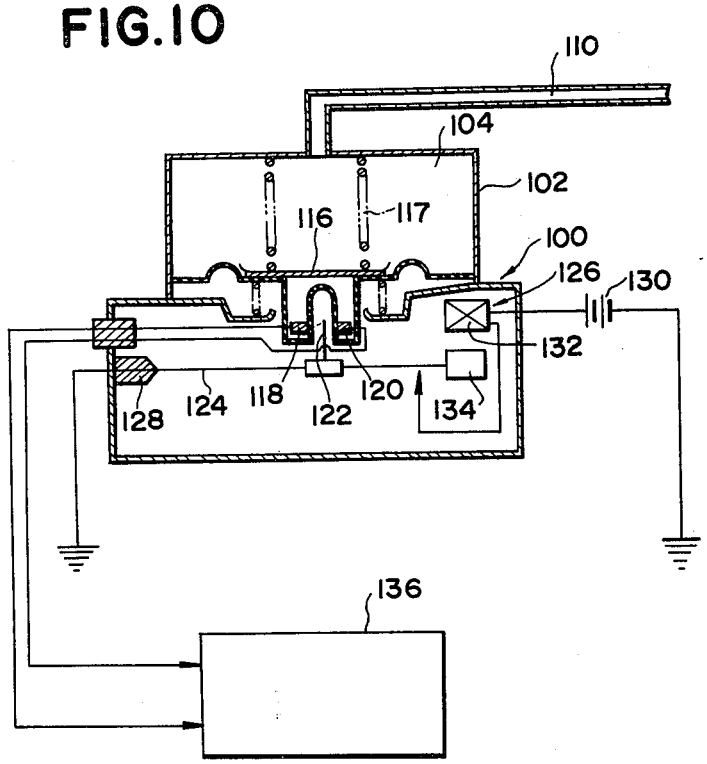
FIG. 10 is a sectional view of a pressure sensor according to another embodiment of the present invention.

Now referring to FIG. 10, there is illustrated another embodiment of the present invention. In FIG. 10, a pressure sensor 100 has a sensor casing 102 which is separated into two chambers 104 and 106 by a diaphragm 108. The chamber 104 communicates with a pressure introducing passage 110. A depressed portion 112 is formed at the central portion of the diaphragm 108. In the depressed portion 112 of the diaphragm 108 is then formed portion 114 pressed in the reverse direction. The depressed portion 108 is covered by a cover plate 116 which is urged to ward the diaphragm 108 by a spring 117. The spring also act to determine an initial position of the diaphragm and thereby determines an initial set pressure of the pressure sensor 100.

On the inner periphery of the depressed portion 114, are provided a light emitting diode (LED) 118 and a phototransistor 120 facing each other. A photo interrupting plate 122 is inserted between the LED 118 and the phototransistor 120. The plate 122 is secured to an elastic arm 124 one end of which is mechanically connected to a vibration providing device 126 and the other end of which is secured to the inner surface of the casing 102 by a support 128. The vibration providing device 126 comprises a battery 130, electromagnet 132, and magnetic element 134 which is secured to the end of the arm 124. The LED 118 and the phototransistor 120 are electrically connected with an arithmetic circuit 136.

Figure 11:
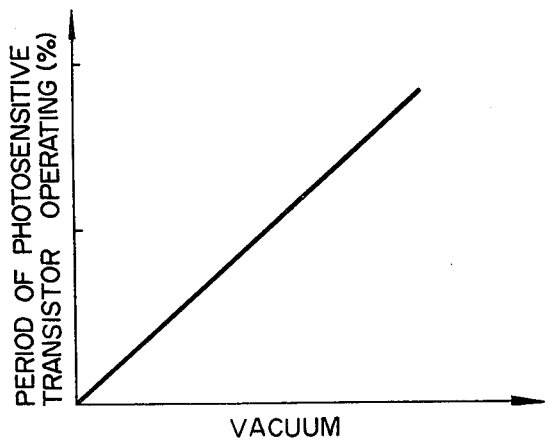
FIG. 11 is a graph showing variation of output of a photo transistor employed in the pressure sensor of FIG. 10.

When a vacuum pressure is introduced into the pressure chamber 104, the diaphragm is moved toward the pressure chamber. Therefore, the LED 118 and the phototransistor 120 are also moved together with the diaphragm. By vibration of the arm 124, the insulating plate 122 is moved to and fro with respect to the depressed portion 114 and thereby intermittently interrupts the light from the LED 118. The time for which the plate 122 interrupts the light from the LED varies according to the movement of the LED 118 and the phototransistor. FIG. 11 shows the relationship between the period for which the phototransistor 120 senses light from the LED 118 and the vacuum introduced into the pressure chamber 104. As seen from FIG. 11, the period for which the phototransistor 120 senses the light from the LED 118 is proportional to the vacuum pressure. In other words, the period is a linear function of negative ingredient of the positive pressure.

Figure 12A:
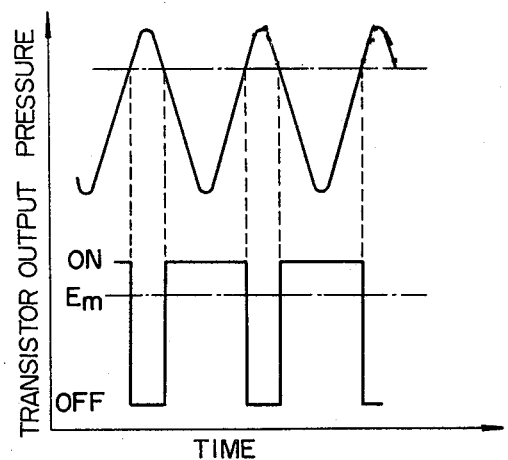
FIGS. 12(A) to 12(C) are graphs similar to FIG. 5.
Figure 12B:
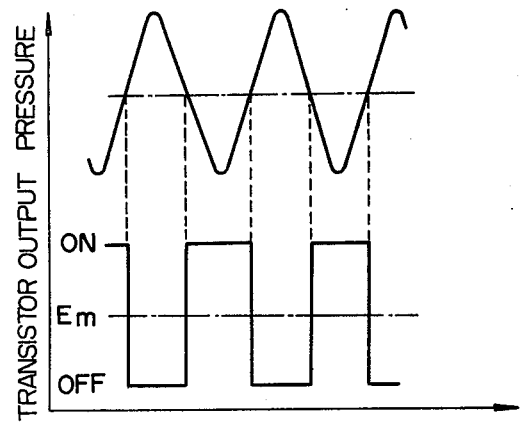
Figure 12C:
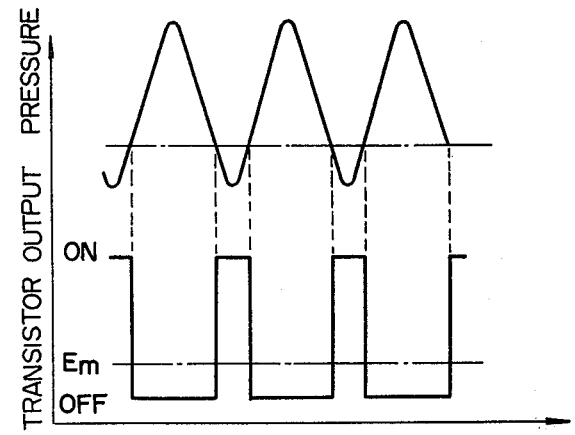

FIGS. 12(a) to (c) show graphs showing the relationship between the vacuum pressure introduced into the pressure chamber 104 and output of the arithmetic circuit 136. As seen from the FIGS. 12(a) to (c), in this embodiment, the output of the arithemtic circuit 136 increases with an increase in the vacuum pressure. FIG. 12 should be compared with FIG. 5 to make clear the difference of relationship of introduced vacuum and the output of arithmetic circuit.

Figure 13:
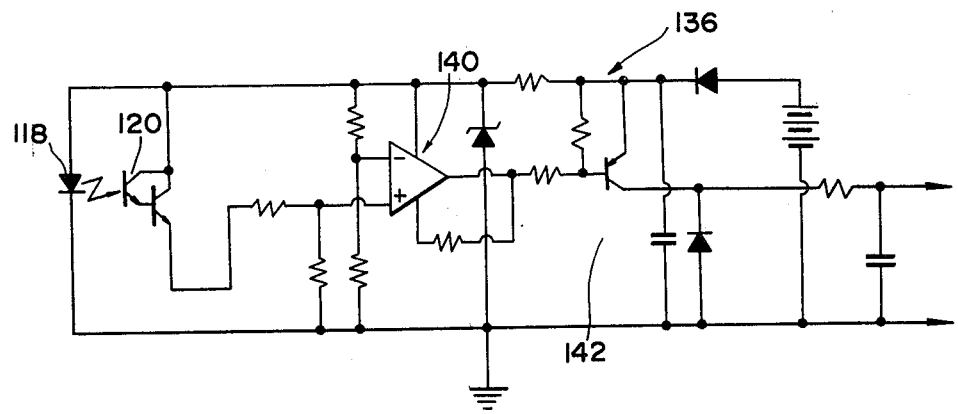
FIG. 13 is a diagram of an amplifying circuit and a smoothing circuit employed in the pressure sensor of FIG. 10.
Figure 14:
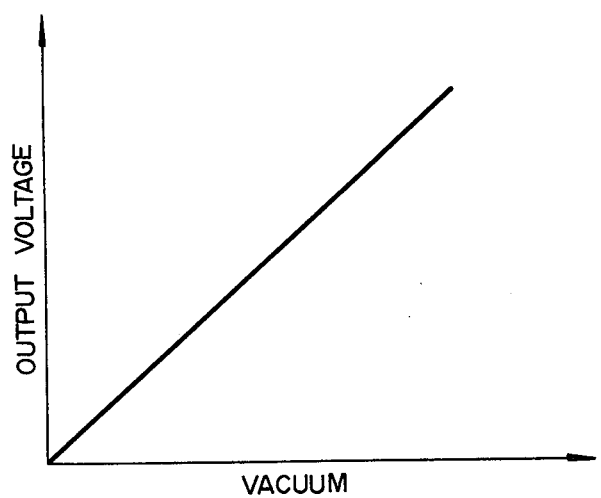
FIG. 14 is a graph showing variation of the output of the smoothing circuit of FIG. 13 corresponding to the introduced vacuum.

In FIG. 13, there is illustrated an operational amplifier 140 and a smoothing circuit 142 used as the arithmetic circuit 136. The output of the pressure sensor inputted to the arithmetic circuit 136 in the form of a pulse signal is amplified and smoothed therein and outputted as constant analog signal. FIG. 14 is a graph showing the relationship between the output of the arithmetic circuit and the vacuum pressure introduced.

Although hereabove are illustrated specific embodiments of the present invention with reference to accompanying drawings, it will be understood that the present invention should not be taken as limited to these embodiments but that various modifications are possible within the scope of the present invention. For example, the vibration providing device as specified and employed in the above-explained embodiment can be embodied otherwise in any suitable form to move the contact or insulating plate to and fro with respect to the pressure chamber. Further although in the present specification, the embodiments are explained in terms of measuring a vacuum pressure, it is of course possible to measure a positive pressure. Also, for example, it will be seen that the movement measuring element may be embodied by any kind of linear action switch, including contactless switches and the like. The present invention should be understood to include all the possible modifications both in the assembled form and in every individual element without departing from the principle of the invention.

What is claimed is:

1. A pressure sensor comprising:
a sensor casing having therein a pressure chamber communicated with a fluid passage for introducing pressurized fluid;
a diaphragm defining said pressure chamber and expanding and adapted to move in response to fluid pressure introduced into said pressure chamber;
means for converting fluid pressure into a length of time in which electric current flows through a sensor circuit, said means including a switch means having first and second parts separated from each other, said first part of said switch means being secured on said diaphragm so that it moves longitudinally with respect to said second part together with said diaphragm and said second part oscillating with respect to said first part with a substantially constant frequency and amplitude, said means generating an output within a period when said first and second parts are located at a given relationship; and
an arithmetic circuit for calculating an average pressure based on the output of said converting means.

2. A pressure sensor as set forth in claim 1, wherein the first and second parts of said switch means carry, respectively, first and second contacts facing one another, said first contact being secured on said diaphragm so that it is moved together with said diaphragm responsive to fluid pressure introduced into said pressure chamber, and a vibration generating means for oscillating said second contact with respect to said first contact with a substantially constant frequency and amplitude.

3. A pressure sensor as set forth in claim 1, wherein said switch means of said converting means comprises a first means including a luminous member and a photosensitive member separated from one another, both of said members being secured onto said diaphragm in opposing relationship, said luminous member being adapted to emit light toward said photosensitive member, and a second means having an isolating member movable through a region between said luminous member and said photo-sensitive member, said isolating member selectively isolating and passing the light generated by the luminous member through said region while said isolating member oscillates with a substantially constant frequency and amplitude.

4. A pressure sensor as set forth in claim 1, 2 or 3, wherein said diaphragm is stretched at the inner periphery of said casing to separate the interior of said casing into two chambers to define said pressure chamber.

5. A pressure sensor as set forth in claim 1, 2 or 3, wherein said diaphragm is supported and stretched at a hollow cylindrical bellows defining said pressure chamber by itself and inserted within the interior of said sensor casing.

6. A pressure sensor as set forth in claim 3, wherein said isolating means is oscillated with respect to said first means by a vibration providing means.

7. A pressure sensor as set forth in claim 2, or 6, wherein said vibration providing means comprises an electrically conductive and elastic arm secured thereon said second means, a magnetic member secured at one end of said arm and an electromagnetic member opposing to said magnetic member for cyclically urging and releasing said magnetic member.

8. A pressure sensor as set forth in claim 3, wherein said switch means comprises a light-emitting diode and a phototransistor.

9. A pressure sensor as set forth in claim 1, wherein said arithmetic circuit comprises a smoothing circuit for smoothing an output of said converting means to obtain an average pressure.

10. A method for determining pressure comprising the steps of:
converting the pressure to a positional variable function;
generating a signal proportional to the function representing the positional variable superimposed with a substantially constantly oscillating function;
comparing the generated signal with a threshold signal to obtain an electrical pulse signal; and
averaging the pulse signal to obtain an analog electrical signal.

11. A method for determining pressure comprising the steps of:
converting a pressure value to a variable distance between first and second elements;
oscillating said second element with respect to said first element at a predetermined frequency and predetermined amplitude;
measuring a period of time in which said second element is within a predetermined distance from said first element;
producing a pulse signal having a pulse width proportional to said measured period; and
converting said pulse signal to an analog signal having a value proportional to the pressure value being measured.

12. A method as set forth in claim 11, wherein the step of converting the pressure value to a positional variable is performed by moving said first element longitudinally with respect to said second element in proportion to magnitude of pressure being measured.

13. A method as set forth in claim 11 or 12, wherein the steps of time period measuring and pulse signal producing are carried out by an on/off switch comprising said first and second elements, said first and second elements including switching contacts that selectively close and open an electric circuit, said steps including closing said circuit by said contact while said second element is located within the predetermined distance from said first element.

14. A method as set forth in claim 13, including locating said first and second elements of said switch means for seccessive mating and separating to produce said pulse signal which has duty cycle representative of a separation of the first and second elements determined in response to the pressure being measured.

15. A method as set forth in claim 11, wherein the step of measuring includes emitting light from a luminous member on said first element through an isolating member on said second element to a photosensitive member, said isolating member isolating said light while it is within the predetermined distance from said first member.

16. A pressure sensor comprising:
a sensor casing;
a diaphragm disposed within said sensor casing and defining therein a pressure chamber, said diaphragm being deformed in response to the pressure introduced into the pressure chamber;
a first member attached to said diaphragm and moveable from an initial position thereof according to the movement of the diaphragm;
a second member disposed adjacent said first member and being oscillated at a substantially constant frequency and amplitude with respect to said first member so that during a period of time, said second member is maintained within a predetermined distance from said first member;
means for measuring the period of time in which said second member is maintained within the predetermined distance from said first member; and
means for producing a signal representative of the measured period.

17. A pressure sensor as set forth in claim 16, wherein said first and second members constitute a switch switchable between a conductive state and a non-conductive state, and said switch is in the conductive state when said second member is within the predetermined distance from said first member.

18. A pressure sensor as set forth in claim 17, wherein said switch serves as said first means, and said switch is maintained in the conductive state while said second member is in contact with said first member to produce said signal, the duration of which is inversely proportional to the distance between said first and second member at the open position of the switch.

19. A pressure sensor as set forth in claim 18, wherein said signal is a pulse signal having a duty cycle representative of a ratio of a closing period and an opening period of said switch, and a smoothing circuit is connected to said switch so that it converts said pulse signal to an analog signal having a signal value representative of the pressure being measured.

20. A pressure sensor as set forth in claim 18 or 19, including vibration imparting means for vibrating said second member at a substantially constant frequency and amplitude with respect to said first member, said vibration imparting means comprising an elastic arm secured to said second member, a magnetic member secured at one end of said arm and an electromagnetic member opposed in spaced relationship to said magnetic member, said electromagnetic member cyclically urging and releasing said magnetic member to oscillate said arm.

21. A pressure sensor as set forth in claim 16, wherein said first member includes a luminous member and a photosensitive member spaced from one another, both of said members being secured onto said diaphragm in an opposing relationship, said luminous member being adapted to emit light toward said photosensitive member, and a second member having an isolating member movable through a region between said luminous member and said photosensitive member, said isolating member selectively isolating and passing light generated by the luminous member through said region while said isolating member isolates with a substantially constant frequency and amplitude.

* * * * *